Sept. 13, 1927.　　　　　　G. B. BOWELL　　　　　　1,642,599
MEANS FOR THE PROJECTION OF CINEMATOGRAPH FILMS
Filed July 6, 1925　　　　2 Sheets-Sheet 1
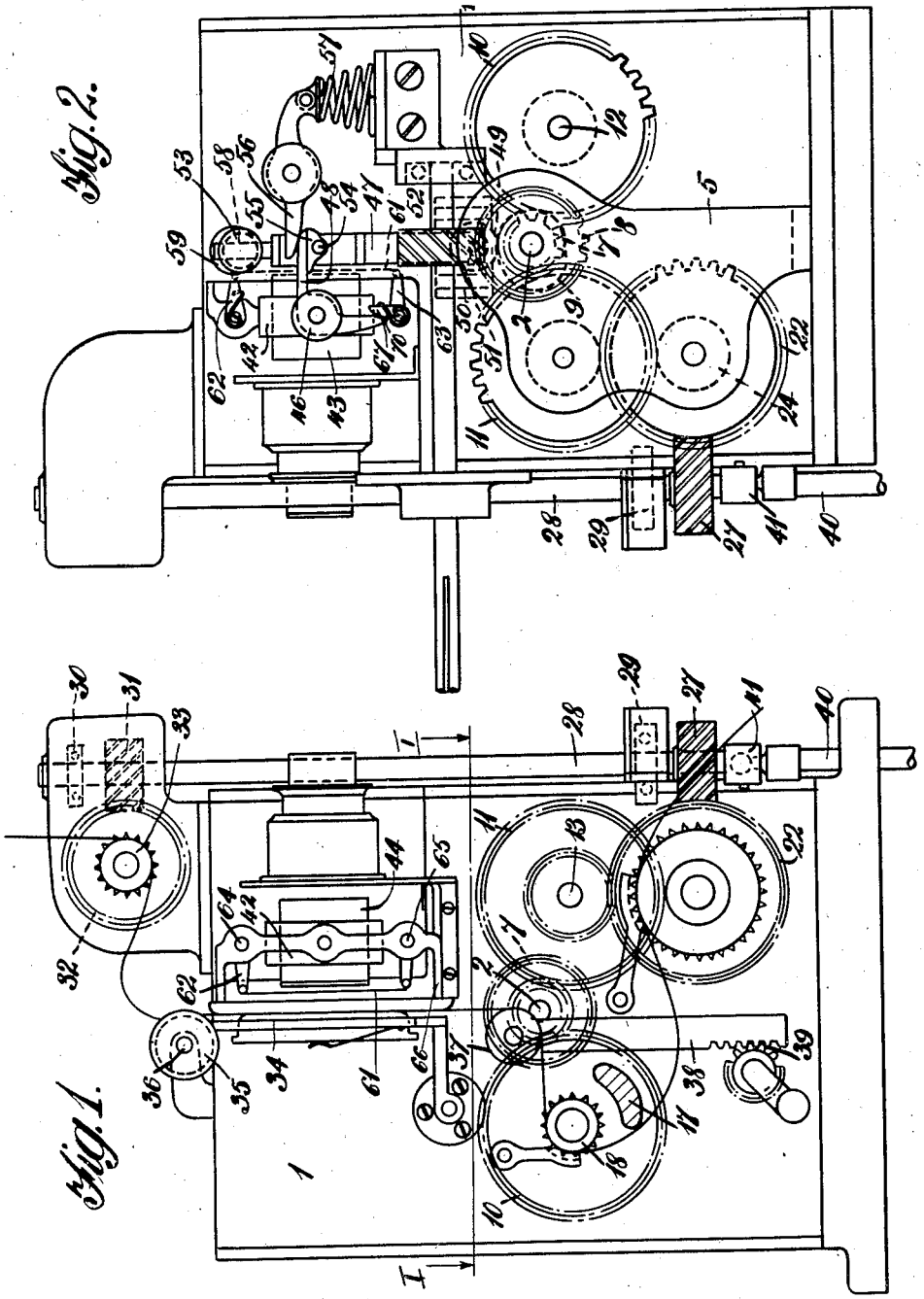
INVENTOR
George Bennett Bowell
By Arthur J. Stephens
Attorney.

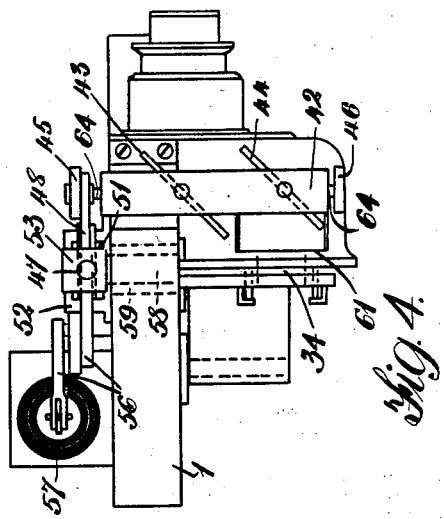

Patented Sept. 13, 1927.

1,642,599

UNITED STATES PATENT OFFICE.

GEORGE BENNETT BOWELL, OF HERTFORDSHIRE, ENGLAND, ASSIGNOR OF ONE-FOURTH TO RALPH GEORGE DINWIDDY, OF BLACKHEATH, LONDON, ENGLAND, AND FIVE-EIGHTHS TO GILBERT RICHARD REDGRAVE, OF SYDENHAM, ENGLAND.

MEANS FOR THE PROJECTION OF CINEMATOGRAPH FILMS.

Application filed July 6, 1925, Serial No. 41,822, and in Great Britain July 11, 1925.

This invention relates to cinematograph projectors in whch the film is fed straight through the gate at a constant speed and the optical axis at the part where it passes the gate is caused to travel with the same speed as the film during the exposure time and to return to its initial position during the period of obturation when the change to the next following film picture takes place.

For the purpose of appropriately controlling the light rays at the gate to attain this result it is essential that they be moved parallel and through a path parallel to the track of the film and that their length remain approximately constant throughout the working cycle, when these and co-related conditions are satisfied the optical conditions appertaining to the light source, the condenser, the focal plane, the objective and the screen remain wholly independent of the fact that the film picture is actually being projected whilst it is in motion, and further the action is independent of the focal length of the objective or of the distance to the screen.

In the mechanism described in my prior Patent No. 1,476,237, which relates to a projector of the above type, the reflectors were of the prismatic or total reflection type, and were oscillated about an axis, or axes, perpendicular to the plane of the film in the gate, in order, inter alia, to obviate cyclic changes in the light switching operation due to refraction. And auxiliary means were provided to compensate for lateral cyclic "wandering" of the image which would be of the amount of the versed sine of half the regular motion of the stabilizer.

According to the present invention the stabilizer for causing the necessary travel of the optical axis comprises a pair of reflectors themselves parallel but inclined at or approximately at 45° to the plane of the film, the reflectors being oscillated about an axis parallel with the plane of the film in the gate and perpendicular to its feed direction. Thus in plan view the film track is offset relative to the stationary part of the optical axis by an amount equal to $\sqrt{2}$ times the distance between the reflectors. The reflectors are of the surface reflection kind, preferably of material such as nickel (rustless) steel. Where illuminating arrangements are suitable one stabilizer only is used, or alternatively I use a light switching arrangement comprising a pair of reflectors exactly similar to and worked in synchronism with the stabilizer. A reciprocating aperture plate is used in conjunction with the stabilizer to define the upper and lower limits of the picture. Means are also provided for varying the amplitude of motion of the various parts of the mechanism to compensate for variations in film pitch, and also for obtaining correct framing, i. e. for ensuring that the correct portion of the film is projected.

Mechanism embodying the invention is shown by way of example in the accompanying drawing, which illustrates diagrammatically parts of a projector using one stabilizer only. For clearness the lamp house, condenser, film spools and other such parts, which may be of any convenient known construction, have been omitted.

Figure 1 is a side view of the projector mechanism.

Figure 2 is a side view taken from the opposite side to Figure 1.

Figure 3 is a plan view on the line I—I of Figure 1 and

Figure 4 is a fragmentary plan view of the stabilizer.

Referring now to the drawings, the mechanism is mounted on a main frame plate 1, the gearing being carried on one side and the gate, sprockets and other parts in direct contact with the film on the other, so that these are left free for access in threading up.

A main spindle 2 is carried in bearings 3, 4, respectively mounted in the plate 1 and a bracket 5 bolted to the plate 1. The spindle 2 carries fast on it the usual flywheel 6, a pinion 7 and helical gear 8, and a cam 9. The pinion 7 meshes with two wheels 10, 11 respectively fast on shafts 12, 13. The shaft 12 is carried in bearings 14, 15, the latter being mounted in a bracket 17 bolted on the face of plate 1, in order to support the outer end of the shaft on which is carried a sprocket 18. The shaft 13 is supported in bearings 19, 20, the bearing 20 being mounted in an extended part of the bracket 5. This shaft 13 has fast on it a helically toothed pinion 21 which meshes with a wheel 22 on a shaft 23 carried in bearings 24, 25, respectively mounted on the plate 1 and bracket 5. The outer end of this shaft 23 carries a sprocket 26 while the wheel 22 meshes with a wheel 27 on a vertical shaft 28 carried in bearings 29, 30, and having fast on it a helical wheel 31 meshing with a wheel 32 which drives an upper sprocket 33. A gate 34 of any convenient construction is mounted on the plate 1 and above it is a film centering device comprising a pair of bevelled flanges 35 on a spindle 36. The bevelled flanges cause the film to centre automatically without side play and without straining the film. A jockey roller 37 for framing the picture is carried on a guided slide 38 and operated by a rack and pinion 39. As shown the film passes (from an upper spool not shown) over sprocket 33, centering flanges 35, through the gate 34 over the roller 37, the sprocket 18 and the sprocket 26 finally passing to a lower spool (not shown). The lower spool may be driven through suitable gearing and the usual friction clutch by a shaft 40 coupled to the shaft 28 by a universal joint 41. The sprockets 33 and 26 are provided to maintain top and bottom loops in the film so as to isolate the portion being projected, which is fed by sprocket 18, from the shocks and tension in the portions being wound on and off the spools. The film runs continuously at a steady speed and there are no intermittent feed parts.

The image of the moving film is brought to rest with respect to the optical axis of projection by a stabilizer comprising an oscillating frame 42 carrying a pair of reflectors, preferably of nickel, (rustless) steel 43, 44, the plate 1 being cut away to clear the frame. The frame 42 is provided with coaxial pivots carried in bearings 45, 46. In the embodiment now being described the axis of the frame is perpendicular to the main axis of projection, that is parallel to the plane of the film and is perpendicular to the feed direction of the film, while the mirrors are parallel to one another and at 45° to the axis of the frame. The frame and mirrors are oscillated from the cam 9 by a reciprocating member 47 and an arm 48 on the frame 42. The end of the member 47 is bifurcated and carries a cam following roller 49 by a spindle 50, also passing through blocks 51 which slide in guides 52 secured to the plate 1 and form a cross head guide for the lower end of the member 47. The upper end of the member 47 is cylindrical and passes through a guide 53. A pivot 54 in the member 47 carries a shoe 55 which bears on the arm 48 and contact between the shoe and arm and between the roller and arm are maintained through a pivoted lever 56 by a spring 57. The effect of the oscillation of the reflectors is to cause the optical axis along $o$, $o'$ to rise and fall but to be held stationary at $a$, $a'$. The rise occurs during the obturation by the shutter, while the fall compensates for the downward movement of the film picture during the exposure. In order to agree with the continuous motion of the film the stabilizer must be turned through such an angle that:—

$$\sqrt{2}d \tan \frac{\alpha}{2} = \frac{h}{2} \cos \frac{\alpha}{2}$$

where $d$ is the perpendicular distance between the mirrors, $h$ is the distance traversed by the film during the exposure time and $\alpha$ is the angle of oscillation of the frame 9, and consequently uniform growth of value $h$ is exactly compensated by uniform travel along a path representing $\sin \frac{\alpha}{2}$. Since in practice $h$ may vary, the upper guide 53 is made laterally adjustable to vary the amplitude of oscillation of the frame 42 by carrying a stalk 58 formed on it eccentrically within a sleeve 59 rotatably carried in the plate 1 and provided with an adjusting handle 60. Since the film travels continuously the aperture in the gate must be long enough to illuminate the film picture throughout its travel during the exposure time. An aperture plate 61 is therefore provided in front of the film which travels with the film at approximately the same speed during the exposure period and defines the upper and lower limits of the projected picture. The aperture plate 61 is carried on upper and lower arms 62, 63, respectively on spindles 64, 65, the lower spindle having an arm 67 on the frame 42 by a spring 70. The contacting surfaces of the arms 66, 67, are shaped so that the aperture plate moves correctly during the exposure period.

During the return period of the mechanism when the change is made to the next picture on the film, the light is obturated by a shutter of any suitable kind carried on a shaft 68 having fast on it a helical wheel 69 meshing with the wheel 8 on shaft 2.

It will be understood that the ratios of the various gears are chosen so that the various sprockets and other parts run at the correct relative speeds. In the embodiment shown, the shafts 12, 13, run at a quarter the speed of the spindle 2 which rotates once per picture, the shaft 23 runs at half the speed 13, the sprocket 18 being a four picture sprocket and the sprocket 26 a four picture sprocket. The vertical shaft 28 runs at twice the speed of shaft 23 and the upper sprocket 33 which is a four picture sprocket runs at the same speed as the vertical shaft 28. The flywheel 6 is grooved to receive a belt for the motor drive, while the end of the shaft 23 may be threaded to receive a driving handle should manual driving be necessary.

What I claim is:—

1. In a cinematograph projector of the continuously moving film kind, a pair of reflectors intercepting the optical axis, mounted to form a common unit oscillatable about an axis parallel with the plane of the film and perpendicular to its direction of motion, and means for oscillating said unit so as to produce a pure vertical displacement of the optical axis for stabilizing the image from the moving film.

2. In a cinematograph projector of the continuously moving film kind, a pair of reflectors intercepting the optical axis, means for oscillating said reflectors so as to produce a pure vertical displacement of the optical axis for stabilizing the image from the moving film, an aperture plate for defining the limits of the projected picture and means for oscillating said aperture plate so that it moves at approximately the same speed as the film during the periods of projection.

3. In a cinematograph projector of the continuously moving film kind, a pair of reflectors intercepting the optical axis each oscillatable about an axis parallel with the plane of the film and perpendicular to its direction of motion, means for oscillating said reflectors so as to produce a pure vertical displacement of the optical axis, and means for adjusting the extent of oscillation of said reflectors to suit the pitch of the film.

4. In a cinematograph projector of the continuously moving film kind, a pair of reflectors intercepting the optical axis mounted to form a common unit oscillatable about an axis parallel with the plane of the film and perpendicular to its direction of motion, means for oscillating said unit so as to produce a pure vertical displacement of the optical axis for stabilizing the image from the moving film, and means for adjusting the stabilized portion of the film in relation to the length of the film.

5. In a cinematograph projector of the continuously moving film kind, a pair of reflectors intercepting the optical axis, means for oscillating said reflectors so as to produce a pure vertical displacement of the optical axis, means for adjusting the extent of oscillation of said reflectors to suit the pitch of the film, an aperture plate for defining the limits of the projected picture and means for oscillating said aperture plate so that it moves at approximately the same speed as the film during the period of projection.

6. In a cinematograph projector of the continuously moving film kind, a pair of reflectors intercepting the optical axis each oscillatable about an axis parallel with the plane of the film and perpendicular to its direction of motion, means for oscillating said reflectors so as to produce a pure vertical displacement of the optical axis, means for adjusting the extent of oscillation of said reflectors to suit the pitch of the film, and means for adjusting the stabilized portion of the film in relation to the length of the film.

7. In a cinematograph projector of the continuously moving film kind, a pair of reflectors intercepting the optical axis, means for oscillating said reflectors so as to produce a pure vertical displacement of the optical axis for stabilizing the image from the moving film, an aperture plate for defining the limits of the projected picture, means for oscillating said aperture plate so that it moves at approximately the same speed as the film during the periods of projection and means for adjusting the stabilized portion of the film in relation to the length of the film.

8. In a cinematograph projector of the continuously moving film kind, a pair of reflectors intercepting the optical axis, means for oscillating said reflectors so as to produce a pure vertical displacement of the optical axis, means for adjusting the extent of oscillation of said reflectors to suit the pitch of the film, an aperture plate for defining the limits of the projected picture, means for oscillating said aperture plate so that it moves at approximately the same speed as the film during the periods of projection and means for adjusting the stabilized portion of the film in relation to the length of the film.

9. In cinematograph projector mechanism of the continuously moving film kind, a frame pivoted transversally of the principal axis of projection, a pair of parallel reflectors intercepting the optical axis carried in said frame inclined to its pivotal axis and means for oscillating said frame so that said reflectors produce a pure vertical displacement of the optical axis for stabilizing the image from the moving film.

10. In cinematograph projector mechanism of the continuously moving film kind, a frame pivoted transversally of the principal axis of projection, a pair of parallel reflectors intercepting the optical axis carried in said frame inclined to its pivotal axis, means for oscillating said frame so that said reflectors produce a pure vertical displacement of the optical axis for stabilizing the image for the moving film and an adjustable jockey roller for adjusting the stabilized portion of the film in relation to the length of the film.

11. In cinematograph projector mechanism of the continuously moving film kind, a frame pivoted transversally of the principal axis of projection, a pair of parallel reflectors intercepting the optical axis carried in said frame inclined to its pivotal axis, a main shaft, a cam on said main shaft, a reciprocating member following said cam, a lever secured on said frame in operative connection with said reciprocating member and spring means for maintaining contact between said reciprocating member and said cam.

12. In cinematograph projector mechanism of the continuously moving film kind, a frame pivoted transversally of the principal axis of projection, a pair of parallel reflectors intercepting the optical axis carried in said frame inclined to its pivotal axis, a main shaft, a cam on said main shaft, a reciprocating member following said cam, a bell crank lever secured on said frame having one arm in operative connection with said reciprocating member, spring means for maintaining contact between said reciprocating member and said cam, an aperture plate for defining the limits of the projected picture, pivoted arms carrying said aperture plate, a lever connected with one of said arms following the second arm of said bell crank lever, and spring means for maintaining contact between said lever and said second bell crank lever arm.

13. In cinematograph projector mechanism of the continuously moving film kind, a frame pivoted transversally of the principal axis of projection, a pair of parallel reflectors intercepting the optical axis, carried in said frame inclined to its pivotal axis, a main shaft, a cam on said main shaft, a reciprocating member following said cam, a cross-head bearing for said reciprocating member, an upper bearing for said reciprocating member, a shoe pivoted on said reciprocating member, a lever secured on said frame, having its end slidable on said shoe, spring means for maintaining contact between said lever and said shoe and between said reciprocating member and said cam, and means for laterally adjusting said upper bearing to vary the amplitude of said lever and frame.

14. In cinematograph projector mechanism of the continuously moving film kind, a frame pivoted transversally of the principal axis of projection, a pair of parallel reflectors intercepting the optical axis carried in said frame inclined to its pivotal axis, a main shaft, a cam on said main shaft, a reciprocating member following said c. n, a cross-head bearing for said reciprocating member, an upper bearing for said reciprocating member, a shoe pivoted on said reciprocating member, a bell crank lever secured on said frame having one arm slidable on said shoe, spring means for maintaining contact between said bell crank lever and said shoe and between said reciprocating member and said cam, means for laterally adjusting said upper bearing to vary the amplitude of said frame, an aperture plate for defining the limits of the projected picture, pivoted arms carrying said aperture plate, a lever connected with one of said arms following the second arm of said bell crank lever, and spring means for maintaining contact between said lever and said second bell crank lever arm.

In witness whereof I have signed my name to this specification.

GEORGE BENNETT BOWELL.